United States Patent
Sugawara et al.

(10) Patent No.: US 10,935,697 B2
(45) Date of Patent: Mar. 2, 2021

(54) RESIN COMPOSITION INCLUDING ACRYLIC BLOCK COPOLYMER AND LIGHT DIFFUSING AGENT

(71) Applicant: KURARAY CO., LTD., Kurashiki (JP)

(72) Inventors: Toshiaki Sugawara, Tsukuba (JP); Makoto Akai, Tsukuba (JP); Dai Kataoka, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/486,058

(22) PCT Filed: Feb. 9, 2018

(86) PCT No.: PCT/JP2018/004531
§ 371 (c)(1),
(2) Date: Aug. 14, 2019

(87) PCT Pub. No.: WO2018/151030
PCT Pub. Date: Aug. 23, 2018

(65) Prior Publication Data
US 2020/0057176 A1    Feb. 20, 2020

(30) Foreign Application Priority Data
Feb. 16, 2017 (JP) .............................. JP2017-027275

(51) Int. Cl.
*G02B 1/04* (2006.01)
*C08F 293/00* (2006.01)
(Continued)

(52) U.S. Cl.
CPC .......... *G02B 1/045* (2013.01); *C08F 293/005* (2013.01); *C08K 3/22* (2013.01);
(Continued)

(58) Field of Classification Search
CPC .. G02B 1/045; C08F 293/005; C08F 2438/00; C08K 3/22; C08K 5/524; C08K 13/02; C08K 2003/2241; C08K 2201/005
See application file for complete search history.

(56) References Cited

U.S. PATENT DOCUMENTS

| 6,075,142 A | 6/2000 | Nishibori et al. |
| 2002/0032290 A1 | 3/2002 | Uchiumi et al. |

(Continued)

FOREIGN PATENT DOCUMENTS

| JP | 6-93060 A | 4/1994 |
| JP | 7-25859 A | 1/1995 |

(Continued)

OTHER PUBLICATIONS

International Search Report dated May 15, 2018 in PCT/JP2018/004531 filed Feb. 9, 2018.

(Continued)

*Primary Examiner* — Bijan Ahvazi
(74) *Attorney, Agent, or Firm* — Oblon, McClelland, Maier & Neustadt, L.L.P.

(57) ABSTRACT

A resin composition is provided which has high transparency, light guiding properties and luminescent properties and can guide light therethrough with little change in chromaticity. A shaped article such as an optical element including the resin composition is also provided. The resin composition includes an acrylic block copolymer (A) and a light diffusing agent (B), wherein the acrylic block copolymer (A) has at least one structure in which polymer blocks (a1) based on methacrylic acid ester units are bonded to both ends of a polymer block (a2) based on acrylic acid ester units, and has a weight average molecular weight of 10,000 to 150,000 and a tensile elastic modulus of 1 to 1,500 MPa, the light diffusing agent (B) is rutile titanium oxide having an average particle size of 0.5 to 2.0 μm, and the content of (Continued)

the light diffusing agent (B) is 0.5 to 10 ppm (on mass basis) based on the acrylic block copolymer (A).

11 Claims, 1 Drawing Sheet

(51) Int. Cl.
    *C08K 3/22*     (2006.01)
    *C08K 5/524*     (2006.01)
    *C08K 13/02*     (2006.01)

(52) U.S. Cl.
    CPC .............. *C08K 5/524* (2013.01); *C08K 13/02* (2013.01); *C08F 2438/00* (2013.01); *C08K 2003/2241* (2013.01); *C08K 2201/005* (2013.01)

(56) References Cited

U.S. PATENT DOCUMENTS

| | | | |
|---|---|---|---|
| 2011/0063872 A1 | 3/2011 | Irie | |
| 2015/0284520 A1* | 10/2015 | Ozawa | C08J 5/00 526/282 |
| 2016/0090479 A1* | 3/2016 | Takahashi | C08L 69/00 524/523 |
| 2016/0244604 A1 | 8/2016 | Tsutsumi et al. | |
| 2016/0347879 A1* | 12/2016 | Kitade | C08F 2/02 |
| 2018/0112023 A1 | 4/2018 | Sugawara et al. | |

FOREIGN PATENT DOCUMENTS

| | | | | | |
|---|---|---|---|---|---|
| JP | 11-335432 | A | | 12/1999 | |
| JP | 2004-351649 | A | | 12/2004 | |
| JP | 2007-295858 | A | | 11/2007 | |
| JP | 2007295858 | A | * | 11/2007 | ............. A01G 13/02 |
| JP | 2012-188503 | A | | 10/2012 | |
| JP | 2012188503 | A | * | 10/2012 | ............... C08K 3/22 |
| JP | 2013125134 | A | * | 6/2013 | ............... C08K 3/22 |
| JP | 5341391 | B2 | | 11/2013 | |
| JP | 2013-254559 | A | | 12/2013 | |
| JP | 5436384 | B2 | | 3/2014 | |
| WO | WO 2015/182750 | A1 | | 12/2015 | |
| WO | WO 2016/190138 | A1 | | 12/2016 | |

OTHER PUBLICATIONS

Moineau, G. et al., "Synthesis of fully acrylic thermoplastic elastomers by atom transfer radical polymerization (ATRP), 2," Macromolecular Chemistry and Physics, vol. 201, 2000, pp. 1108-1114.

Extended European Search Report as received in the corresponding European patent application No. 18753895.4, dated Dec. 1, 2020, (citing document AW, 7 pages).

* cited by examiner

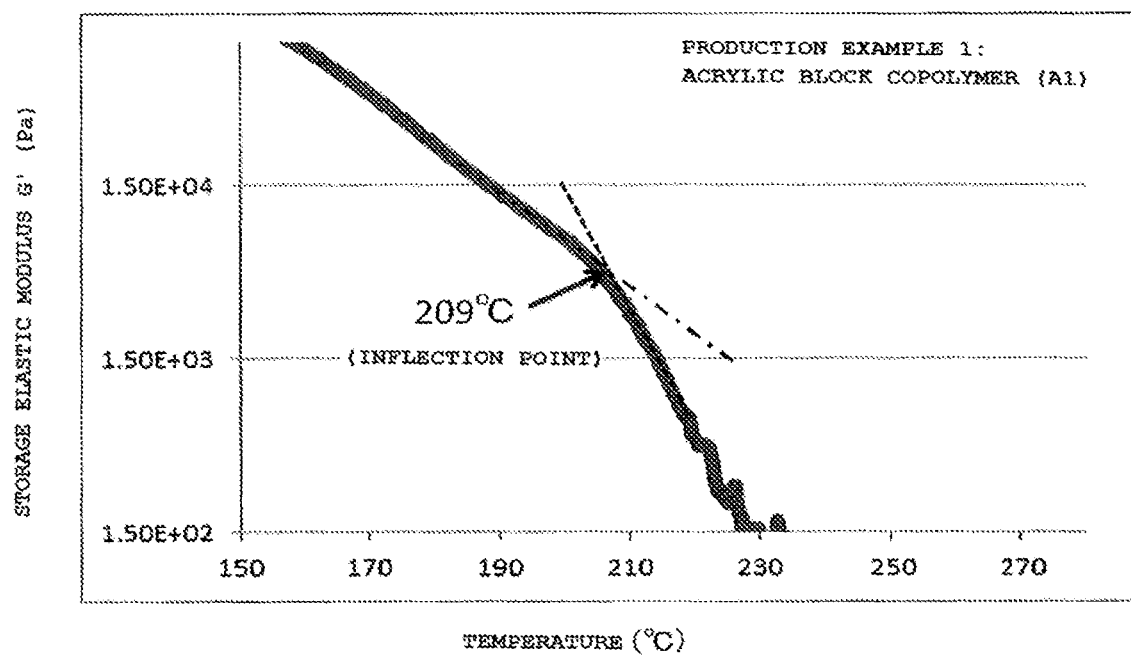

RESIN COMPOSITION INCLUDING ACRYLIC BLOCK COPOLYMER AND LIGHT DIFFUSING AGENT

TECHNICAL FIELD

The present invention relates to a resin composition including an acrylic block copolymer and a light diffusing agent, and to a shaped article including the composition.

BACKGROUND ART

Acrylic block copolymers that have a structure formed by bonding of an acrylic acid ester polymer block and a methacrylic acid ester polymer block are known to be useful in various fields because of their flexibility and outstanding transparency and weather resistance. Such acrylic block copolymers are used in, for example, films and sheets in the optical field, and outdoor construction materials.

An example optical element made from an acrylic block copolymer is a flexible luminous body that includes a resin composition containing an acrylic block copolymer and light diffusing particles (see Patent Literature 1).

A side emitting optical fiber which is composed of a core layer including an acrylic polymer and a light scattering material, and a clad layer based on a fluorine-containing polymer is presented as an optical element with enhanced luminance (see Patent Literature 2). Unfortunately, these techniques still have room for improvement, and resin compositions with excellent transparency, light guiding properties and luminescent properties are demanded.

CITATION LIST

Patent Literature

Patent Literature 1: Japanese Patent No. 5436384
Patent Literature 2: Japanese Patent No. 5341391

SUMMARY OF INVENTION

Technical Problem

An object of the present invention is to provide a resin composition which has high transparency, light guiding properties and luminescent properties and can guide light therethrough with little change in chromaticity. Another object of the present invention is to provide a shaped article such as an optical element including the resin composition.

Solution to Problem

The present inventors carried out extensive studies to achieve the above objects. As a result, the present inventors have found that the problems discussed above can be solved with a composition including a specific acrylic block copolymer and a specific light diffusing agent in specific proportions. The present invention has been completed based on the finding and further studies.

The present invention relates to:

[1] A resin composition including an acrylic block copolymer (A) and a light diffusing agent (B), wherein the acrylic block copolymer (A) has at least one structure in which polymer blocks (a1) based on methacrylic acid ester units are bonded to both ends of a polymer block (a2) based on acrylic acid ester units, and has a weight average molecular weight of 10,000 to 150,000 and a tensile elastic modulus of 1 to 1,500 MPa, the light diffusing agent (B) is rutile titanium oxide having an average particle size of 0.5 to 2.0 μm, and the content of the light diffusing agent (B) is 0.5 to 10 ppm (on mass basis) based on the acrylic block copolymer (A).

[2] The resin composition described in [1], which includes 0.01 to 1 part by mass of a phosphite compound of the formula (i) below as an antioxidant (C) per 100 parts by mass of the acrylic block copolymer (A),

[Chem. 1]

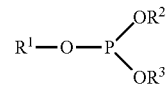

(i)

wherein $R^1$ is an optionally substituted aromatic group, $R^2$ and $R^3$ are each independently a hydrogen atom or an organic group, $R^1$ and $R^2$ or $R^3$ may be bonded to each other to form a ring together with the phosphorus atom and the oxygen atom constituting the phosphite, and $R^2$ and $R^3$ may be bonded to each other to form a ring together with the phosphorus atom and the oxygen atom constituting the phosphite.

[3] The resin composition described in [1] or [2], wherein the refractive index of the acrylic block copolymer (A) is 1.485 to 1.495.

[4] The resin composition described in any one of [1] to [3], wherein the order-disorder transition temperature (ODTT) of the acrylic block copolymer (A) is not more than 260° C.

[5] The resin composition described in any one of [1] to [4], wherein the polymer block (a2) is a copolymer block including 50 to 90 mass % of an acrylic acid alkyl ester and 50 to 10 mass % of an acrylic acid aromatic ester.

[6] The resin composition described in any one of [1] to [5], wherein the polymer blocks (a1) and the polymer block (a2) each have a refractive index of 1.485 to 1.495.

[7] The resin composition described in any one of [1] to [6], which includes 0.1 to 4 ppm (on mass basis), based on the acrylic block copolymer (A), of a blue colorant with a maximum absorption wavelength in the range of 590 to 610 nm as a colorant (D).

[8] The resin composition described in any one of [1] to [7], which includes 0.1 to 10 ppm (on mass basis), based on the acrylic block copolymer (A), of a purple colorant with a maximum absorption wavelength in the range of 510 to 530 nm as a colorant (D).

[9] A shaped article including the resin composition described in any one of [1] to [8].

[10] The shaped article described in [9], which is an optical element.

[11] The shaped article described in [9], which is a light guide.

Advantageous Effects of Invention

By virtue of the configurations of the present invention described above, the resin compositions and shaped articles thereof such as optical elements attain high transparency, light guiding properties and luminescent properties and can guide light therethrough with little change in chromaticity.

BRIEF DESCRIPTION OF DRAWING

FIG. 1 is a chart illustrating a relationship between temperature (abscissa) and storage elastic modulus G' (ordinate, logarithmic scale) in an acrylic block copolymer (A1) obtained in Production Example 1.

DESCRIPTION OF EMBODIMENTS

The present invention will be described in detail hereinbelow.

A resin composition of the present invention includes an acrylic block copolymer (A) and a light diffusing agent (B). The acrylic block copolymer (A) has at least one structure in which polymer blocks (a1) based on methacrylic acid ester units are bonded to both ends of a polymer block (a2) based on acrylic acid ester units, and has a weight average molecular weight of 10,000 to 150,000 and a tensile elastic modulus of 1 to 1,500 MPa. The light diffusing agent (B) is rutile titanium oxide having an average particle size of 0.5 to 2.0 μm. In the resin composition of the invention, the content of the light diffusing agent (B) is 0.5 to 10 ppm (on mass basis) based on the acrylic block copolymer (A).

<Acrylic Block Copolymers (A)>

The acrylic block copolymer (A) in the invention has at least one structure in which polymer blocks (a1) based on methacrylic acid ester units are bonded to both ends of a polymer block (a2) based on acrylic acid ester units, that is, at least one (a1)—(a2)—(a1) structure (in which "—" denotes a chemical bond).

The content of the methacrylic acid ester units in the polymer block (a1) is preferably not less than 50 mass %, more preferably not less than 60 mass %, still more preferably not less than 80 mass %, and particularly preferably not less than 90 mass %, and may be 100 mass %. Examples of the methacrylic acid esters for forming the methacrylic acid ester units include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate.

Of these methacrylic acid esters, methacrylic acid alkyl esters such as methyl methacrylate, ethyl methacrylate, isopropyl methacrylate, n-butyl methacrylate, tert-butyl methacrylate, cyclohexyl methacrylate and isobornyl methacrylate are preferable to enhance transparency and heat resistance, and methyl methacrylate is more preferable. The polymer blocks (a1) may be composed of a single, or two or more kinds of these methacrylic acid esters.

Without causing a hindrance to the objects and advantageous effects of the invention, the polymer blocks (a1) may contain comonomer components such as units derived from methacrylic acid esters with reactive groups, for example, glycidyl methacrylate and allyl methacrylate; or units derived from additional polymerizable monomers other than methacrylic acid esters, for example, acrylic acid esters capable of forming structural units in the polymer block (a2), methacrylic acid, acrylic acid, aromatic vinyl compounds, acrylonitriles, methacrylonitriles and olefins. To ensure that the advantageous effects of the invention will be sufficiently obtained, the amount of units derived from these methacrylic acid esters with reactive groups or additional polymerizable monomers is preferably small, and is preferably not more than 10 mass %, and more preferably not more than 2 mass %.

The content of the acrylic acid ester units in the polymer block (a2) is preferably not less than 50 mass %, more preferably not less than 60 mass %, still more preferably not less than 80 mass %, and particularly preferably not less than 90 mass %, and may be 100 mass %. Examples of the acrylic acid esters for forming the acrylic acid ester units include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate.

Of these acrylic acid esters, acrylic acid alkyl esters such as methyl acrylate, ethyl acrylate, isopropyl acrylate, n-butyl acrylate, 2-ethylhexyl acrylate, dodecyl acrylate, phenoxyethyl acrylate and 2-methoxyethyl acrylate are preferable to enhance flexibility, and n-butyl acrylate and 2-ethylhexyl acrylate are more preferable. The polymer block (a2) may be composed of a single, or two or more kinds of these acrylic acid esters.

Without causing a hindrance to the objects and advantageous effects of the invention, the polymer block (a2) may contain comonomer components such as units derived from acrylic acid esters with reactive groups, for example, glycidyl acrylate and allyl acrylate; or units derived from additional polymerizable monomers other than acrylic acid esters, for example, methacrylic acid esters capable of forming structural units in the polymer blocks (a1), methacrylic acid, acrylic acid, aromatic vinyl compounds, acrylonitriles, methacrylonitriles and olefins. To ensure that the advantageous effects of the invention will be sufficiently obtained, the amount of units derived from these acrylic acid esters with reactive groups or additional polymerizable monomers is preferably small, and is preferably not more than 10 mass %, and more preferably not more than 2 mass %.

To enhance the transparency and light guiding properties of the acrylic block copolymer (A), it is preferable that the polymer block (a2) is a copolymer block of an acrylic acid alkyl ester with an acrylic acid aromatic ester. Some preferred examples of the acrylic acid aromatic esters are benzyl acrylate, phenyl acrylate, phenoxyethyl acrylate, phenoxydiethylene glycol acrylate, phenoxy-polyethylene glycol acrylate and 2-hydroxy-3-phenoxypropyl acrylate, with benzyl acrylate being more preferable.

In the above case in which the polymer block (a2) is a copolymer block of an acrylic acid alkyl ester with an acrylic acid aromatic ester, the polymer block (a2) is preferably a copolymer block containing 50 to 90 mass % of an acrylic acid alkyl ester and 50 to 10 mass % of an acrylic acid aromatic ester, and is more preferably a copolymer block containing 60 to 80 mass % of an acrylic acid alkyl ester and 40 to 20 mass % of an acrylic acid aromatic ester. The use of such a polymer block (a2) is advantageous in that the refractive index and the order-disorder transition temperature (ODTT) described later may be controlled to the preferred ranges and also in that transparency and light guiding properties may be enhanced.

While the form of the molecular chain of the acrylic block copolymer (A) is not particularly limited and may be any of, for example, linear, branched and radial as long as the copolymer has at least one structure in which the polymer blocks (a1) are bonded to both ends of the polymer block (a2), it is preferable that the copolymer is a triblock copolymer represented by (a1)—(a2)—(a1). Here, the properties such as molecular weights and compositions of the polymer blocks (a1) at both ends of (a2) may be the same as or different from each other. The resin composition of the present invention may include a diblock copolymer represented by (a1)—(a2) in addition to the acrylic block copolymer (A).

The weight average molecular weight of the acrylic block copolymer (A) is 10,000 to 150,000 in order to attain enhancements in transparency and light guiding properties. To ensure that the resin composition of the present invention and shaped articles thereof will attain enhancements in properties such as flexibility and shaping workability, the weight average molecular weight of the acrylic block copolymer (A) is preferably 30,000 to 120,000, and more preferably 50,000 to 100,000. By virtue of the weight average molecular weight of the acrylic block copolymer (A) being 10,000 or more, a sufficient melt tension can be ensured during melt extrusion and a satisfactory shaped article can be obtained. Further, the shaped article obtained attains excellent mechanical properties such as break strength. Due to the weight average molecular weight of the acrylic block copolymer (A) being 150,000 or less, a quality shaped article tends to be obtained by melt extrusion with little occurrence of fine grained irregularities on the surface or granular structures ascribed to unmolten components (high-molecular components) on the surface of the shaped article.

To attain enhancements in transparency and light guiding properties, the molecular weight distribution of the acrylic block copolymer (A) which is represented by the ratio (Mw/Mn) of the weight average molecular weight (Mw) to the number average molecular weight (Mn) is preferably in the range of 1.01 to 1.50, and more preferably in the range of 1.01 to 1.35. By adopting this range, the content of unmolten components that form granular structures in shaped articles of the resin composition of the invention can be reduced to an extremely low level.

The weight average molecular weight (Mw) and the number average molecular weight (Mn) in the present specification are polystyrene-equivalent molecular weights measured by gel permeation chromatography, and may be determined by the method described later in Examples.

The tensile elastic modulus of the acrylic block copolymer (A) is 1 to 1,500 MPa, and preferably 10 to 1,000 MPa. By virtue of the tensile elastic modulus in this range, the resin composition and shaped articles thereof attain an excellent balance between mechanical strength and flexibility.

The tensile elastic modulus of the acrylic block copolymer (A) may be measured in accordance with ISO 527-2 with respect to a dumbbell-shaped (ISO B type) article fabricated from the acrylic block copolymer (A). The details of the measurement method are described later in Examples. The tensile elastic modulus of the acrylic block copolymer (A) may be increased by, for example, increasing the proportion of the polymer blocks (a1).

The order-disorder transition temperature (ODTT) of the acrylic block copolymer (A) may be not more than 270° C., and is preferably not more than 260° C. When the ODTT is not more than 260° C., workability is enhanced to offer good profile extrusion properties, and a shaped article that is obtained attains excellent surface smoothness, with the result that the optical loss through the shaped article is reduced, and light guiding properties are enhanced. Further, the shaping temperature can be decreased, making it possible to prevent a lowering in transparency due to thermal coloration during the shaping process. The ODTT is more preferably not more than 250° C., and still more preferably not more than 230° C. Although the lower limit is not particularly limited, the ODTT is, for example, 100° C. or above.

The order-disorder transition temperature (ODTT) of the acrylic block copolymer (A) may be controlled to a desired value, for example, by controlling the weight average molecular weight or molecular weight distribution (Mw/Mn) of the acrylic block copolymer (A) or by controlling the composition of the polymer block (a2). More specifically, for example, the ODTT is increased as the weight average molecular weight or molecular weight distribution (Mw/Mn) of the acrylic block copolymer (A) is increased, and the ODTT is increased with increasing proportion of acrylic acid alkyl ester units in the polymer block (a2). The ODTT may be measured by the method described in Examples.

The refractive index of the acrylic block copolymer (A) may be 1.475 to 1.495, and is preferably 1.485 to 1.495, and more preferably 1.490 to 1.495. When the refractive index is in this range, the resin composition that is obtained attains enhanced transparency and light guiding properties. The refractive index of the acrylic block copolymer (A) may be measured by a V block method with a refractometer with respect to a 3 mm thick shaped article fabricated from the acrylic block copolymer (A). The measurement method will be described in detail later in Examples. The refractive index of the acrylic block copolymer (A) may be increased by, for example, increasing the proportion of acrylic acid aromatic ester units in the polymer block (a2).

Because the refractive index of the acrylic block copolymer (A) is affected by the refractive indexes of the polymer blocks (a1) and the polymer block (a2), the refractive indexes of these polymer blocks may be each 1.465 to 1.495, and are preferably each 1.485 to 1.495, and more preferably each 1.490 to 1.495. The refractive index of the polymer blocks (a1) may be measured by the same method as the refractive index of the acrylic block copolymer (A) is measured. The refractive index of the polymer block (a2) may be calculated from the refractive index of the acrylic block copolymer (A) and that of the polymer blocks (a1). Specifically, the refractive indexes of the polymer blocks (a1) and (a2) may be determined as described later in Examples.

The acrylic block copolymer (A) may be produced by any method that is deemed as known without limitation. For example, living polymerization of monomers that will form the respective blocks is generally used. Examples of such living polymerization techniques include a method where anionic polymerization is performed using an organic alkali metal compound as a polymerization initiator in the presence of a mineral acid salt such as a salt of an alkali metal or an alkaline earth metal (see JP-B-H07-25859), a method where anionic polymerization is performed in the presence of an organoaluminum compound while using an organic alkali metal compound as a polymerization initiator (see JP-A-H11-335432), a method where polymerization is performed using an organic rare earth metal complex as a polymerization initiator (see JP-A-H06-93060), and a method where radical polymerization is performed using an α-halogenated ester compound as an initiator in the presence of a copper compound (see Macromol. Chem. Phys., Vol. 201, pp. 1108-1114 (2000)). Examples further include a method where monomers that will form the respective blocks are polymerized using a polyvalent radical polymerization initiator or a polyvalent radical chain transfer agent so as to produce a mixture containing the acrylic block copolymer (A). Of these methods, in particular, anionic polymerization performed in the presence of an organoaluminum compound while using an organic alkali metal compound as a polymerization initiator, is recommended for the reasons that the acrylic block copolymer (A) can be obtained with high purity, the control of the molecular weight and the compositional ratio is easy, and the method is economically efficient.

The resin composition of the present invention may include a single acrylic block copolymer (A), or may include two or more acrylic block copolymers (A).

<Light Diffusing Agents (B)>

The light diffusing agent (B) in the present invention is rutile titanium oxide having an average particle size of 0.5 to 2.0 μm. The light diffusing agent (B) is contained in the resin composition of the invention in a proportion of 0.5 to 10 ppm by mass based on the acrylic block copolymer (A). Titanium oxide has a large difference in refractive index from the acrylic block copolymer (A) that is the substrate, and can offer superior diffusion effects at small dose. Titanium oxide that is of rutile type further imparts excellent weather resistance and thermal stability to the resin composition. Specifically, for example, "infrared-shielding titanium oxide JR-1000" (product name, manufactured by TAYCA CORPORATION) may be suitably used as such rutile titanium oxide.

The average particle size of the rutile titanium oxide is 0.5 to 2.0 μm. If use is made of pigment-grade titanium oxide or fine particulate titanium oxide with an average particle size of about 0.4 μm or less, the particles are smaller than the wavelengths in the visible light region (0.4 to 0.7 μm) and the scattering of light with short wavelengths of 0.4 μm and below is so intensified by the influence of Rayleigh scattering. Consequently, the transmitted light tends to take on a bluish tone near the light source and a yellowish tone further from the light source. When, in contrast, the light diffusing agent that is used is rutile titanium oxide with an average particle size of about 0.5 μm or more such as the above infrared-shielding titanium oxide, wavelengths in the infrared region (0.7 to 3 μm) are effectively scattered and the scattering of light in the yellow to red visible light region with wavelengths of 0.5 μm and above is intensified, with the result that the transmitted light tends to take on a bluish tone further from the light source.

Incidentally, when light is passed through a shaped article produced using the acrylic block copolymer (A), the transmitted light sometimes takes on a yellowish tone further from the light source due to the influence of factors such as thermal history applied during melt processing. In the present invention, such coloring of transmitted light can be suppressed and the change in chromaticity after light guiding can be lessened by the use of the rutile titanium oxide having high infrared shielding properties as the light diffusing agent (B). To obtain such effects, the average particle size of the rutile titanium oxide needs to be in the range of 0.5 to 2.0 μm, and is preferably in the range of 0.5 to 1.5 μm, and more preferably in the range of 0.8 to 1.2 μm. The average particle size of the rutile titanium oxide may be measured by the method described later in Examples.

The resin composition of the present invention needs to contain the light diffusing agent (B) in an amount of 0.5 to 10 ppm by mass based on the acrylic block copolymer (A). The content is preferably 0.8 to 8 ppm. With increasing content of the light diffusing agent (B), the resin composition and shaped articles tend to be less transparent and tend to diffuse more light near the light source to exhibit low light guiding properties. If the content of the light diffusing agent (B) is too low, the resin composition that is obtained and shaped articles thereof fail to diffuse light sufficiently and tend to cause a decrease in luminance when light is passed therethrough.

While the resin composition of the present invention may consist solely of the acrylic block copolymer (A) and the light diffusing agent (B) described hereinabove, the composition may further include one, or two or more optional components selected from antioxidants (C), colorants (D) and other additional components. The total content of the acrylic block copolymer (A) and the light diffusing agent (B) in the resin composition of the invention is preferably not less than 40 mass %, more preferably not less than 60 mass %, still more preferably not less than 80 mass %, even more preferably not less than 90 mass %, and particularly preferably not less than 95 mass %, and may be 100 mass % of the composition.

<Antioxidants (C)>

The antioxidants (C) are not particularly limited, and examples thereof include phosphite compounds, phenol compounds and sulfur compounds. The antioxidants (C) may be used singly, or two or more may be used in combination. Of the antioxidants (C), it is preferable to use a phosphite compound and/or a phenol compound to enhance transparency, light guiding properties and chromaticity. It is more preferable that a phosphite compound is used alone as the antioxidant.

The types of phosphite compounds are not particularly limited. For example, compounds represented by the following formula (i) (hereinafter, also written as the "phosphite compounds (i)") may be preferably used.

[Chem. 2]

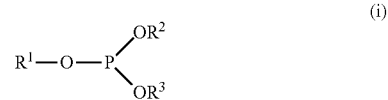

(i)

In the formula (i), $R^1$ is an optionally substituted aromatic group, $R^2$ and $R^3$ are each independently a hydrogen atom or an organic group, $R^1$ and $R^2$ or $R^3$ may be bonded to each other to form a ring together with the phosphorus atom and the oxygen atom constituting the phosphite, and $R^2$ and $R^3$ may be bonded to each other to form a ring together with the phosphorus atom and the oxygen atom constituting the phosphite.

Examples of the optionally substituted aromatic groups represented by $R^1$ include phenyl group, substituted phenyl groups, phenylene group and substituted phenylene groups.

The organic groups represented by $R^2$ and/or $R^3$ may be any organic groups which do not impair the function of the phosphite compound (i). Examples of such organic groups include alkyl groups, substituted alkyl groups, phenyl group, substituted phenyl groups, and alkylene groups.

In the phosphite compound (i), $R^1$ and $R^2$ may be bonded to each other to form a ring together with the phosphorus atom and the oxygen atom constituting the phosphite, and $R^1$ and $R^3$ may be bonded to each other to form a ring together with the phosphorus atom and the oxygen atom constituting the phosphite.

Specific examples of the phosphite compounds (i) include triphenyl phosphite, tris(2,4-di-tert-butylphenyl) phosphite, tris(2,5-di-tert-butylphenyl) phosphite, tris(nonylphenyl) phosphite, tris(dinonylphenyl) phosphite, tris(mono- and di-nonylphenyls) phosphite, bis(2-tert-butyl-4,6-dimethylphenyl) ethyl phosphite, diphenyl acid phosphite, diphenyl decyl phosphite, phenyl diisodecyl phosphite, 2,2'-methylenebis(4,6-di-tert-butylphenyl) octyl phosphite, 2,2'-methylenebis(4,6-di-tert-butylphenyl) octadecyl phosphite, 2,2'-ethylidenebis(4,6-di-tert-butylphenyl) fluorophosphite, bis (2,4-di-tert-butylphenyl) pentaerythritol diphosphite, bis(2,5-di-tert-butylphenyl) pentaerythritol diphosphite, bis(2,6-di-tert-butyl-4-methylphenyl) pentaerythritol diphosphite, bis(2,4,6-tri-tert-butylphenyl) pentaerythritol diphosphite, bis(2,4-dicumylphenyl) pentaerythritol diphosphite, phenyl-4,4'-isopropylidenediphenol pentaerythritol diphosphite, tetra(C12-15 alkyls) bisphenol A diphosphite, tetrakis(2,4-di-tert-butylphenyl) biphenylene diphosphonite, tetratridecyl-4,4'-butylidene bis(2-tert-butyl-5-methylphenol) diphosphite, bis[2,2'-methylenebis(4,6-diamylphenyl)] isopropylidene diphenyl phosphite, hydrogenated-4,4'-isopropylidenediphenol polyphosphite, bis(octylphenyl) bis[4,4'-n-butylidenebis(2-tert-butyl-5-methylphenol)]1,6-hexanediol diphosphite, 2-butyl-2-ethylpropanediol 2,4,6-tri-tert-butylphenol monophosphite, and tris(2-[(2,4,8,10-tetrakis-tert-butyldibenzo[d,f][1,3,2]di oxaphosphepin-6-yl) oxy]ethyl)amine. These phosphite compounds (i) may be used singly, or two or more may be used in combination.

The phosphite compounds (i) may be commercial products. Examples of such commercial phosphite compounds (i) include "ADK STAB PEP-36", "ADK STAB PEP-36A" and "ADK STAB 2112" (trade names, manufactured by ADEKA CORPORATION).

When the resin composition of the invention includes the antioxidant (C), the content of the antioxidant (C) is preferably 0.01 to 1 part by mass, and more preferably 0.02 to 0.5 parts by mass per 100 parts by mass of the acrylic block copolymer (A).

<Colorants (D)>

The colorants (D) are not particularly limited, and examples thereof include inorganic pigments, organic pigments and dyes. The colorants (D) may be used singly, or two or more may be used in combination. To reduce the change in chromaticity when light is passed through a shaped article, it is preferable to use as the colorant (D) a blue colorant having a maximum absorption wavelength in the range of 590 to 610 nm, and/or a purple colorant having a maximum absorption wavelength in the range of 510 to 530 nm.

When the blue colorant is used, the content thereof is preferably 0.1 to 4 ppm, and more preferably 0.3 to 2 ppm by mass based on the acrylic block copolymer (A). When the purple colorant is used, the content thereof is preferably 0.1 to 10 ppm, more preferably 0.3 to 7 ppm, and still more preferably 0.5 to 7 ppm by mass based on the acrylic block copolymer (A). To attain a further reduction in chromaticity change, it is preferable to use the blue colorant and the purple colorant in combination. Specifically, the contents of these colorants are preferably 0.3 to 2 ppm by mass and 0.5 to 7 ppm by mass, respectively, based on the acrylic block copolymer (A).

From the point of view of the reduction in chromaticity change, it is preferable that the resin composition of the present invention includes the blue colorant and/or the purple colorant together with the phosphite compound (i). The maximum absorption wavelengths may be calculated by analyzing a sample formed from the resin composition containing the colorant(s) (D) with a UV-visible spectrophotometer so as to measure the spectral transmittances.

The colorants (D) may be commercial products. Examples of such commercial colorants (D) include blue pigment "BPA-5500A" and purple pigment "TV-4M" (trade names, manufactured by Nippon Pigment Company Limited).

<Additional Components>

The additional components are not particularly limited as long as they do not belong to the acrylic block copolymers (A), the light diffusing agents (B), the antioxidants (C) or the colorants (D). Examples thereof include polymers other than the acrylic block copolymers (A), and various additives.

Examples of such additional polymers include methacrylic resins; olefin resins such as polyethylene, polypropylene, polybutene-1, poly-4-methylpentene-1 and polynorbornene; ethylene ionomers; styrene resins such as polystyrene, styrene-maleic anhydride copolymer, high-impact polystyrene, AS resins, ABS resins, AES resins, AAS resins, ACS resins and MBS resins; methyl methacrylate-styrene copolymer; polyester resins such as polyethylene terephthalate, polybutylene terephthalate and polylactic acid; polyamide resins such as nylon 6, nylon 66 and polyamide elastomers; polyurethane resins such as ester polyurethane elastomers, ether polyurethane elastomers, non-yellowing ester polyurethane elastomers and non-yellowing carbonate polyurethane elastomers; polycarbonates, polyvinyl chlorides, polyvinylidene chlorides, polyvinyl alcohols, ethylene-vinyl alcohol copolymers, polyacetals, polyvinylidene fluorides, modified polyphenylene ethers, polyphenylene sulfides, silicone rubber modified resins and phenoxy resins. Of these, a methacrylic resin is preferable from the point of view of the compatibility with the acrylic block copolymer (A).

The content of the additional polymer in the resin composition of the present invention is preferably not more than 10 mass %.

The methacrylic resin is preferably a methacrylic acid ester homopolymer or a copolymer based on methacrylic acid ester units. The content of the methacrylic acid ester units in the methacrylic resin is preferably not less than 50 mass %, more preferably not less than 60 mass %, still more preferably not less than 80 mass %, and particularly preferably not less than 90 mass %, and may be 100 mass %. Examples of the methacrylic acid esters for forming the methacrylic acid ester units include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate.

Of these, methacrylic acid alkyl esters such as methyl methacrylate, ethyl methacrylate, isopropyl methacrylate, n-butyl methacrylate, tert-butyl methacrylate, cyclohexyl methacrylate and isobornyl methacrylate are preferable from the points of view of the compatibility with the acrylic block copolymer (A), and the transparency and shaping workability of the resin composition. Methyl methacrylate is more preferable. The methacrylic resin may be composed of a single methacrylic acid ester, or two or more methacrylic acid esters.

Without causing a hindrance to the objects and advantageous effects of the invention, the methacrylic resin may contain methacrylic acid ester units derived from a methacrylic acid ester having a reactive group, for example, glycidyl methacrylate or allyl methacrylate, in a small amount, preferably in an amount of not more than 20 mass %, and more preferably not more than 10 mass %.

When the methacrylic resin is a copolymer based on methacrylic acid ester units, other monomers that are copolymerized with the methacrylic acid ester are not particularly limited. Examples thereof include acrylic acid esters such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate and allyl acrylate; unsaturated carboxylic acids such as methacrylic acid, acrylic acid and maleic anhydride; olefins such as ethylene, propylene, 1-butene, isobutylene and 1-octene; conjugated dienes such as 1,3-butadiene, isoprene and myrcene; aromatic vinyls such as styrene, a-methylstyrene, p-methylstyrene and m-methylstyrene; vinyl acetate, vinylpyridine, acrylonitrile, methacrylonitrile, vinyl ketone, vinyl chloride, vinylidene chloride, vinylidene fluoride, acrylamide and methacrylamide, with acrylic acid esters being preferable and methyl acrylate being more preferable. The methacrylic resin may include a single, or two or more such comonomers.

When the methacrylic resin is a copolymer, the form of the copolymer is not particularly limited. For example, the copolymer may be a random copolymer, a block copolymer or an alternating copolymer.

The stereoregularity of the methacrylic resin is not particularly limited, and isotactic, heterotactic or syndiotactic resins may be used.

The weight average molecular weight (Mw) of the methacrylic resin is not particularly limited, but is preferably 30,000 to 500,000, and more preferably 70,000 to 200,000. The methacrylic resin used in the invention may be a single methacrylic resin or a mixture of two or more kinds of methacrylic resins having different properties such as weight average molecular weights (Mw).

The methacrylic resins may be commercial products. Examples of such commercial methacrylic resins include "PARAPET GF", "PARAPET H1000B", "PARAPET EH" and "PARAPET HRL" (trade names, manufactured by KURARAY CO., LTD.).

Examples of the additives include rubbers, softeners, fillers, lubricants, heat stabilizers, UV absorbers, light stabilizers, pressure-sensitive adhesives, tackifiers, plasticizers, antistatic agents, foaming agents and flame retardants. These additives may be used singly, or two or more may be used in combination. To attain further enhancements in transparency, light guiding properties, luminescent properties, heat resistance, weather resistance and light resistance, it is practically preferable to add such additives as heat stabilizers, UV absorbers and light stabilizers.

Examples of the rubbers include acrylic rubbers; silicone rubbers; styrene thermoplastic elastomers such as SEPS, SEBS and SIS; and olefin rubbers such as IR, EPR and EPDM.

Examples of the softeners include mineral oil softeners for enhancing fluidity during the shaping process, such as paraffinic oils and naphthenic oils.

Examples of the fillers include inorganic fillers for enhancing, for example, heat resistance and weather resistance, as well as for other purposes such as increasing the bulk, such as calcium carbonate, talc, carbon black, titanium oxide, silica, clay, barium sulfate and magnesium carbonate; and inorganic fibers or organic fibers for reinforcement, such as glass fibers and carbon fibers.

The resin composition of the invention may be prepared by any method without limitation. A method where the components that will constitute the resin composition are mixed together by melt-kneading is recommended in order to highly disperse the components. For example, the mixing and kneading operation may be performed using a known mixing or kneading device such as a kneader-ruder, an extruder, a mixing roll or a Banbury mixer. In particular, a twin-screw extruder is preferably used. The temperature during the mixing and kneading process may be controlled appropriately in accordance with factors such as the melting point of the acrylic block copolymer (A) that is used. It is usually recommended that mixing and kneading take place at a temperature in the range of 110 to 300° C. By the method described above, the resin composition of the invention may be obtained in the desired form such as pellets or a powder. The resin composition in such a form as pellets or a powder is suitably handled as a shaping material.

The resin composition of the present invention may be shaped into articles using a shaping method and a shaping device which are generally used for thermoplastic polymers, and shaped articles including the resin composition of the invention may be thus obtained. For example, such shaped articles may be produced by a solution casting method or a thermal melt shaping method such as extrusion, injection molding, compression molding, blow molding, calendering or vacuum forming. In particular, the resin composition of the invention is suited for extrusion because of its outstanding profile extrusion properties and melt fluidity, and can give extrudates having excellent surface smoothness.

Alternatively, a shaping method may be adopted in which the acrylic block copolymer (A) in the form of pellets, the light diffusing agent (B) and optional components such as the antioxidant (C) and the colorant (D) are mixed together without heating and in the absence of oil using a device such as a Henschel mixer, a tumbler, a super mixer or a ribbon blender, and the mixture is fed directly to the melt shaping device described above. In the case of small-scale production, a simplified method may be adopted in which the acrylic block copolymer (A) in the form of pellets, the light diffusing agent (B) and optional components such as the antioxidant (C) and the colorant (D) are added to a bag such as a resin bag, which is then tied and closed and is shaken to allow the components to be mixed together.

The acrylic block copolymer (A) is tacky, and therefore pellets thereof may block to one another. This problem may be avoided by attaching a powdery component, for example, the light diffusing agent (B), the antioxidant (C) or the colorant (D) to the surface of the pellets to prevent the blocking of the pellets. Further, this anti-blocking approach allows the material to be supplied smoothly to the melt shaping device, and also stabilizes the quality of shaped articles that are produced.

By the shaping methods described above, articles having desired shapes may be obtained such as fibers, molded articles, pipes, sheets, films, fibrous products and laminated bodies. Further, shaped articles having a core-clad structure may be also obtained.

The shaped articles made from the resin composition of the invention may be used in any applications without limitation and can find use in numerous applications such as optical field, food field, medical field, consumer goods field, automobile field, and electric/electronic field.

In particular, because the resin composition and shaped articles of the present invention have excellent transparency, profile extrusion properties, surface smoothness and light guiding properties, the shaped articles of the present invention may be suitably used for optical elements.

An example of such optical elements is light guides, such as light guides having a core-clad structure, which are used as auxiliary lights in automotive interior lighting devices, specifically, auxiliary lights installed in peripheries of vehicle instrument panels, peripheries of car audio systems and car navigation systems, door panels, console boxes and pillars. Further, the optical elements may be applied to courtesy lights, map lamps, room lamps, floor lamps, foot lamps, ceiling lamps and door lamps, and may be also applied to automotive exterior lighting devices such as automotive headlamps and tail lamps, brake lamps, side marker lamps and license plate lamps. Application is also possible to sunlight transmission, optical signal transmission such as automotive wirings, mobile wirings and FA apparatus wirings, optical sensors such as liquid level sensors and pressure sensors, image guides such as endoscopes, and light guides in optical instruments. Further, the optical elements may be suitably used in illuminations, lighting, liquid crystal display backlights and variable signs in mobile phones, digital cameras, watches, pachinko machines, slot machines, vending machines, dog collars, ornaments, traffic signs, wash basins, showers, bathtub water temperature indicators, OA equipment, household electrical appliances, optical equipment, various building materials, stairs, railings, train platforms, outdoor billboards and barrier-free spaces, and light guides in heat ray- or UV-screened lights in museums and art museums. Combinations of the light guides and light sources may be used as lighting devices in various illuminations and lighting equipment.

Examples of the applications further include various covers, various terminal plates, printed circuit boards, speakers, microscopes, binoculars, cameras, watches or clocks; video-, optical recording-, optical communication- and information equipment-related parts such as finders, filters, prisms, Fresnel lenses, various optical disc (such as VD, CD, DVD, MD and LD) substrate protective films, optical switches, optical connectors and liquid crystal displays in cameras, VTRs, projection TVs and the like; liquid crystal display light guide films and sheets, flat panel displays, flat panel display light guide films and sheets, plasma displays, plasma display light guide films and sheets, retardation films and sheets, polarizing films and sheets, polarizer protective films and sheets, waveplates, light diffusing films and sheets, prism films and sheets, reflective films and sheets, antireflective films and sheets, viewing angle enlarging films and sheets, antiglare films and sheets, luminance improving films and sheets, liquid crystal or electroluminescence display element substrates, touch panels, touch panel light guide films and sheets, and spacers between various front plates and various modules. In particular, the shaped articles of the invention are preferably used as light guides.

The shaped articles of the present invention have other superior properties such as weather resistance and flexibility, and thus may be suitably used in known construction materials such as, for example, interior and exterior elements for construction, curtain walls, roofing elements, roofing materials, window elements, gutters, exteriors, wall materials, flooring materials, fixture materials, road construction elements, retroreflective films and sheets, agricultural films and sheets, lighting covers, signs and translucent sound insulation walls.

EXAMPLES

The present invention will be described in detail based on examples hereinbelow. However, it should be construed that the present invention is in no way limited to those examples. The measurement apparatuses and measurement methods used in Production Examples, Examples and Comparative Examples are described below.

(1) Weight Average Molecular Weight (Mw) and Molecular Weight Distribution (Mw/Mn)

The weight average molecular weight (Mw) and number average molecular weight (Mn) of an acrylic block copolymer (A) were determined relative to standard polystyrenes by gel permeation chromatography (hereinafter, abbreviated as GPC). The molecular weight distribution (Mw/Mn) was calculated from the weight average molecular weight (Mw) and the number average molecular weight (Mn).

GPC apparatus: "HLC-8020" manufactured by TOSOH CORPORATION

Separation columns: "TSKgel GMHXL", "G4000HXL" and "G5000HXL" manufactured by TOSOH CORPORATION were connected in series.

Eluent: tetrahydrofuran

Flow rate of eluent: 1.0 ml/min

Column temperature: 40° C.

Detection method: differential refractive index (RI)

(2) Proportions of Polymer Blocks

The proportions of polymer blocks in an acrylic block copolymer (A), and the compositional ratios of the respective polymer blocks were determined by 1H-NMR (1H-nuclear magnetic resonance) measurement. Details are described below.

Nuclear magnetic resonance apparatus: "JNM-LA400" manufactured by JEOL Ltd.

Deuterated solvent: deuterated acetone (3) Refractive Index

An acrylic block copolymer (A) was melted at 230° C. and was molded into an article 32 mm in length, 6 mm in width and 3 mm in thickness using the ultra-small injection molding machine described below. A sample (an 8 mm×8 mm×11 mm right triangle having a thickness of 3 mm) was cutout from the shaped article, and was tested by a V block method at a measurement temperature of 25° C. using the refractometer and conditions described below to measure the refractive index.

Ultra-small injection molding machine: "Mini Max Molder" manufactured by Custom Scientific Instruments, Inc.

Refractometer: "PR-2" manufactured by Carl Zeiss Jena

Measurement wavelength: 587.562 nm (d line)

The refractive index of the acrylic block copolymer (A) and that of the polymer blocks (a1) were determined by the above method, and the refractive index of the polymer block (a2) was determined from the calculation formula described below using the refractive indexes of the acrylic block copolymer (A) and the polymer blocks (a1).

Calculation formula: Refractive index of polymer block (a2)={Refractive index of acrylic block copolymer (A)−(Refractive index of polymer blocks (a1)×Volume fraction of polymer blocks (a1))}÷Volume fraction of polymer block (a2)

The volume fractions are values determined using the following calculation formulas.

Calculation formulas:

$$\text{Volume fraction of polymer blocks }(a1) = \frac{\dfrac{\text{Proportion (mass \%)}}{\text{of polymer blocks }(a1)}}{\dfrac{\text{Proportion (mass \%)}}{\text{Specific gravity of}} + \dfrac{\text{Proportion (mass \%)}}{\text{of polymer block }(a2)}} \quad \text{[Math. 1]}$$

$$\text{Volume fraction of polymer block }(a2) = \frac{\dfrac{\text{Proportion (mass \%) of}}{\text{polymer block }(a2)}}{\dfrac{\text{Proportion (mass \%)}}{\text{Specific gravity of polymer block }(a2)} + \dfrac{\text{Proportion (mass \%)}}{\text{of polymer block }(a2)}}$$

(4) Flexibility (Tensile Elastic Modulus)

An acrylic block copolymer (A) was molded into a dumbbell-shaped (ISO B type) article using the injection molding machine described below at the cylinder temperature and the mold temperature described below, and the shaped article was tested on the tester described below in accordance with ISO 527-2 to determine the tensile elastic modulus.

Injection molding machine: "UH1000-80" manufactured by NISSEI PLASTIC INDUSTRIAL CO., LTD.
Cylinder temperature: 220° C. (Production Example 1), 230° C. (Production Examples 2 and 3)
Mold temperature: 50° C. (Production Examples 1 to 3)
Tester: "Universal Tester AG-I" manufactured by SHIMADZU CORPORATION (5) Order-Disorder Transition Temperature (ODTT)

An acrylic block copolymer (A) was press molded using the press machine described below at 230° C. to give a sheet-shaped article having a thickness of 1 mm. The shaped article was stamped into a disc having a diameter of 25 mm, which was then tested by a method in accordance with JIS K7244-10 using the apparatus and conditions described below to determine the storage elastic modulus G' at a temperature range of 100 to 280° C. From the data thus obtained, a chart (a) was prepared in which the ordinate was the logarithmic scale of storage elastic modulus G' (Pa) and the abscissa was temperature (° C.). According to general knowledge, the temperature at which G' starts to decrease sharply in the chart (α) is the order-disorder transition temperature (ODTT).

Specifically, the inflection point in the chart (α) was determined in accordance with JIS B0103-5113, and the corresponding temperature was obtained as the order-disorder transition temperature (ODTT) (see FIG. 1).

Press machine: "Press Molding Machine AYS10" manufactured by Shinto Metal Industries, Ltd.
Dynamic viscoelasticity measuring apparatus: "ARES Viscoelasticity Measurement System" manufactured by Rheometric Scientific Inc.
Measurement mode: parallel flat plates
Vibration frequency: 6.28 rad/sec
Strain applied: 0.5%
Heat-up rate: 3° C./min (6) Average Particle Size of Titanium Oxide The average particle size of titanium oxide was determined by analyzing a transmission electron microscope image with an automated image processing device to measure the horizontal bisecting diameters. Here, the horizontal bisecting diameter is the horizontal chord length in the Y axis direction that divides a particle into two equal areas.

Transmission electron microscope: "JEM-1230" manufactured by JEOL Ltd.
Desktop automated multifunctional image analyzer: "LUZEX AP" manufactured by NIRECO CORPORATION (7) Thermal Stability The weight change of a light diffusing agent (B) used in Example or Comparative Example was measured under the conditions described below to calculate the 5% weight loss temperature of the light diffusing agent (B). The 5% weight loss temperature obtained was compared with the 5% weight loss temperature of an acrylic block copolymer (A) (280° C.) and was rated under the criteria described below. The rating was used as the indicator of thermal stability.

A: Equal to or higher than 5% weight loss temperature of acrylic block copolymer (A) (280° C.)
B: Less than 5% weight loss temperature of acrylic block copolymer (A) (280° C.)

Thermogravimetric analyzer: "TGA/DSC 1" manufactured by METTLER TOLEDO
Atmosphere gas: air
Start temperature: 30° C.
Finish temperature: 500° C.
Heat-up rate: 10° C./min (8) Luminescent Properties A resin composition obtained in Example or Comparative Example was molded into a sheet-shaped article 5 cm in length, 5 cm in width and 3 mm in thickness using an injection molding machine under the conditions described below. A white LED light source was arranged at an end face of the molded article, and light was guided through the article. The surface luminance in a direction perpendicular to the light source was measured.

Injection molding machine: "SE18DU" manufactured by Sumitomo Heavy Industries, Ltd.
Cylinder temperature: 230° C.
Mold temperature: 60° C.
Spectroradiometer: "SR-3A" manufactured by TOPCON TECHNOHOUSE CORPORATION
Light source: White LED light source (luminous flux 135 lm, directional characteristics)120°)
Distance between luminance meter and molded article: 5 cm (9) Transparency A sheet-shaped article 5 cm in length, 5 cm in width and 3 mm in thickness was obtained in the same manner as described in (8). With the direct reading haze meter described below, the haze of the molded article was measured in accordance with ISO 14782.

Direct reading haze meter: "NDH5000" manufactured by NIPPON DENSHOKU INDUSTRIES CO., LTD.

(10) Light Guiding Properties

A sheet-shaped article 5 cm in length, 5 cm in width and 3 mm in thickness was obtained in the same manner as described in (8). The spectral transmittance in the width direction (optical length: 5 cm) of the molded article was measured, and the light transmittance at 420 nm wavelength was determined. Further, the yellowness b* was determined using color-matching functions in accordance with JIS Z8701-1999, thereby evaluating the degree of coloration of light transmitted through the molded article. The details of the apparatus used are described below. The closer to 0 the value of yellowness b*, the less the coloration and the more suited the article as a light guide.

Ultraviolet visible near infrared spectrophotometer: "V-670" manufactured by JASCO Corporation Light sources: deuterium lamp (D2) and halogen lamp (WI)

(11) Luminance, Chromaticity and Rate of Change in Chromaticity of Light Guide

A resin composition obtained in Example or Comparative Example was extruded under the temperature conditions described in Table 3 to give a round bar-shaped article having a diameter of 3.3 mm. Both ends of the shaped article were cut vertically to adjust the length of the shaped article to 1 m. A white LED light source was arranged at an end face of the shaped article, and light was guided through the article. At positions 10 cm and 90 cm away from the light source, the luminance and the chromaticity coordinates x and y were measured. The details of the apparatus used are described below. Further, the chromaticity coordinates x and y at 10 cm position were used as the references, and the rates of change (in absolute values) in chromaticity coordinates x and y at 90 cm position were calculated using the equation described below, thereby obtaining an indicator of chromaticity change. The smaller the rates of change, the more suited the article as a light guide. The rates of change are preferably not more than 10%.

Spectroradiometer: "SR-3A" manufactured by TOPCON TECHNOHOUSE CORPORATION

Light source: White LED light source (luminous flux 135 lm, directional characteristics)120°)

Rate of chromaticity change (%)=|[(Chromaticity at 90 cm distance from light source)−(Chromaticity at 10 cm distance from light source)](Chromaticity at 10 cm distance from light source)×100|

<Acrylic Block Copolymers (A)>

Production Example 1

Synthesis of Acrylic Block Copolymer

A1

The inside of a 20 L reaction vessel was deaerated and was purged with nitrogen. Thereafter, at room temperature, there were added 10.29 kg of dried toluene, 0.019 kg of hexamethyltriethylenetetramine, and 0.35 kg of a toluene solution containing 0.17 mol of isobutyl bis(2,6-di-t-butyl-4-methylphenoxy)aluminum. Further, 0.077 mol of sec-butyllithium was added. To the mixture, 0.52 kg of methyl methacrylate was added, and the reaction was performed at room temperature for 1 hour. Subsequently, the inner temperature of the polymerization liquid was lowered to −25° C., and a mixture liquid containing 1.26 kg of n-butyl acrylate and 0.45 kg of benzyl acrylate was added dropwise over a period of 1 hour. Thereafter, 1.19 kg of methyl methacrylate was added, and the reaction liquid was brought back to room temperature and was stirred for 8 hours. Next, 0.30 kg of methanol was added to the reaction liquid to terminate the polymerization. After the termination of the polymerization, the reaction liquid was poured into a large excess of methanol, and the resultant precipitate was recovered. An acrylic block copolymer (A1) was thus obtained.

The acrylic block copolymer (A1) had a triblock structure composed of polymer block (a1-1)-polymer block (a2)-polymer block (a1-2). The (a1-1):(a2):(a1-2) mass ratio was 15.2:50.0:34.8. The weight average molecular weight (Mw) was 61,500, and the molecular weight distribution (Mw/Mn) was 1.14. The evaluation results are described in Table 1.

Production Example 2

Synthesis of Acrylic Block Copolymer

A2

An acrylic block copolymer (A2) was obtained in the same manner as in Production Example 1, except that the amount of n-butyl acrylate was changed to 1.69 kg and benzyl acrylate was not added.

The acrylic block copolymer (A2) had a triblock structure composed of polymer block (a1-1)-polymer block (a2)-polymer block (a1-2). The (a1-1):(a2):(a1-2) mass ratio was 15.0:50.5:34.5. The weight average molecular weight (Mw) was 61,300, and the molecular weight distribution (Mw/Mn) was 1.14. The evaluation results are described in Table 1.

Production Example 3

Synthesis of Acrylic Block Copolymer

A3

The inside of a 20 L reaction vessel was deaerated and was purged with nitrogen. Thereafter, at room temperature, there were added 10.29 kg of dried toluene, 0.019 kg of hexamethyltriethylenetetramine, and 0.35 kg of a toluene solution containing 0.17 mol of isobutyl bis(2,6-di-t-butyl-4-methylphenoxy)aluminum. Further, 0.077 mol of sec-butyllithium was added. To the mixture, 0.50 kg of methyl methacrylate was added, and the reaction was performed at room temperature for 1 hour. Subsequently, the inner temperature of the polymerization liquid was lowered to −25° C., and 2.09 kg of n-butyl acrylate was added dropwise over a period of 1 hour. Thereafter, 0.82 kg of methyl methacrylate was added, and the reaction liquid was brought back to room temperature and was stirred for 8 hours. Next, 0.30 kg of methanol was added to the reaction liquid to terminate the polymerization. After the termination of the polymerization, the reaction liquid was poured into a large excess of methanol, and the resultant precipitate was recovered. An acrylic block copolymer (A3) was thus obtained.

The acrylic block copolymer (A3) had a triblock structure composed of polymer block (a1-1)-polymer block (a2)-polymer block (a1-2). The (a1-1):(a2):(a1-2) mass ratio was 14.7:61.2:24.1. The weight average molecular weight (Mw) was 65,600, and the molecular weight distribution (Mw/Mn) was 1.09. The evaluation results are described in Table 1.

TABLE 1

|  | Prod. Ex. 1 | Prod. Ex. 2 | Prod. Ex. 3 |
| --- | --- | --- | --- |
| Acrylic block copolymer (A) | A1 | A2 | A3 |
| Type of acrylic block copolymer (A) | Triblock | Triblock | Triblock |

TABLE 1-continued

|  | Prod. Ex. 1 | Prod. Ex. 2 | Prod. Ex. 3 |
|---|---|---|---|
| Polymer block (a1-1) component (mass %) | MMA 100 | MMA 100 | MMA 100 |
| Polymer block (a2) components (mass %) | nBA/BzA 73.6/26.4 | nBA 100/0 | nBA 100/0 |
| Polymer block (a1-2) component (mass %) | MMA 100 | MMA 100 | MMA 100 |
| Weight average molecular weight (Mw) of acrylic block copolymer (A) | 61,500 | 61,300 | 65,600 |
| Molecular weight distribution (Mw/Mn) of acrylic block copolymer (A) | 1.14 | 1.14 | 1.09 |
| Content (mass %) of polymer blocks (a1) in acrylic block copolymer (A) | 50.0 | 50.5 | 38.8 |
| Refractive index of acrylic block copolymer (A) | 1.492 | 1.479 | 1.477 |
| Refractive index of polymer blocks (a1) | 1.492 | 1.492 | 1.492 |
| Refractive index of polymer block (a2) | 1.492 | 1.467 | 1.467 |
| Tensile elastic modulus (MPa) of acrylic block copolymer (A) | 612 | 950 | 173 |
| ODTT (° C.) of acrylic block copolymer (A) | 209 | 263 | 263 |

MMA: methyl methacrylate
nBA: n-butyl acrylate
BzA: benzyl acrylate

<Light Diffusing Agents (B)>

The following were used as light diffusing agents (B) in Examples and Comparative Examples.
(b-1) Titanium oxide "JR-1000" manufactured by TAYCA CORPORATION (average particle size: 1.0 μm, rutile type)
(b-2) Titanium oxide "JR-301" manufactured by TAYCA CORPORATION (average particle size: 0.3 μm, rutile type)
(b-3) Aluminum oxide "AL-43M" manufactured by SHOWA DENKO K. K. (average particle size: 1.5 μm)
(b-4) Polystyrene "TECHPOLYMER XX-147D" manufactured by SEKISUI PLASTICS CO., LTD. (average particle size: 4 μm)
(b-5) Polystyrene "TECHPOLYMER SBX-6" manufactured by SEKISUI PLASTICS CO., LTD. (average particle size: 6 μm)
(b-6) Polystyrene "TECHPOLYMER SBX-12" manufactured by SEKISUI PLASTICS CO., LTD. (average particle size: 12 μm)
(b-7) Silicone resin "Tospearl 120" manufactured by Momentive Performance Materials Japan LLC. (average particle size: 2 μm)
(b-8) Silicone resin "Tospearl 2000B" manufactured by Momentive Performance Materials Japan LLC. (average particle size: 6 μm)

<Antioxidant (C)>

The following was used as an antioxidant (C) in Examples and Comparative Examples.
(c-1) Phosphite compound "ADK STAB PEP36/36A" manufactured by ADEKA CORPORATION Colorants (D)

The following were used as colorants (D) in Examples.
(d-1) Blue pigment "BPA-5500A" manufactured by Nippon Pigment Company Limited (maximum absorption wavelength: 600 nm)
(d-2) Purple pigment "TV-4M" manufactured by Nippon Pigment Company Limited (maximum absorption wavelength: 520 nm)

Examples 1, 2 and 7 to 11

With use of a twin-screw extruder, the acrylic block copolymers (A1) to (A3) obtained in Production Examples 1 to 3, the light diffusing agents (B), the antioxidant (C) and the colorants (D) were melt-kneaded in the proportions described in Table 2 below at a cylinder temperature of 200° C. The kneaded products were extruded and cut to give pellets of resin compositions. The results of the evaluation of the resin compositions are described in Table 2.

Comparative Examples 1 to 10

With use of a twin-screw extruder, the acrylic block copolymer (A1) obtained in Production Example 1, the light diffusing agents (B) and the antioxidant (C) were melt-kneaded in the proportions described in Table 2 below at a cylinder temperature of 200° C. The kneaded products were extruded and cut to give pellets of resin compositions. The results of the evaluation of the resin compositions are described in Table 2.

TABLE 2

|  | Ex. 1 | Ex. 2 | Ex. 7 | Ex. 8 | Ex. 9 | Ex. 10 | Ex. 11 |
|---|---|---|---|---|---|---|---|
| Acrylic block copolymers (A) | | | | | | | |
| Acrylic block copolymer (A1) (parts by mass) | 100 | 100 | | | | | |
| Acrylic block copolymer (A2) (parts by mass) | | | 100 | 100 | | | |
| Acrylic block copolymer (A3) (parts by mass) | | | | | 100 | 100 | 100 |
| Light diffusing agents (B) | | | | | | | |
| Titanium oxide (b-1) (ppm) *1 | 1 | 7.5 | 1 | 1 | 1 | 1 | 1 |
| Titanium oxide (b-2) (ppm) *1 | | | | | | | |
| Aluminum oxide (b-3) (ppm) *1 | | | | | | | |
| Polystyrene (b-4) (ppm) *1 | | | | | | | |
| Polystyrene (b-5) (ppm) *1 | | | | | | | |

TABLE 2-continued

|  | | | | | | | |
|---|---|---|---|---|---|---|---|
| Polystyrene (b-6) (ppm) *1 | | | | | | | |
| Silicone resin (b-7) (ppm) *1 | | | | | | | |
| Silicone resin (b-8) (ppm) *1 | | | | | | | |
| Antioxidant (C) | | | | | | | |
| Phosphite compound (c-1) (parts by mass) *2 | 0.1 | 0.1 | 0.1 | 0.1 | 0.1 | 0.1 | 0.1 |
| Colorants (D) | | | | | | | |
| Blue colorant (d-1) (ppm) *1 | 1 | | 1 | 2 | 1 | 2 | 1 |
| Purple colorant (d-2) (ppm) *1 | 1 | | 5 | 3 | 1 | 5 | 1 |
| Light diffusing agent | | | | | | | |
| Average particle size (μm) | 1 | 1 | 1 | 1 | 1 | 1 | 1 |
| Thermal stability | A | A | A | A | A | A | A |
| Luminescent properties | | | | | | | |
| Surface luminance (cd/m²) | 13 | 92 | 9 | 9 | 10 | 9 | 10 |
| Transparency | | | | | | | |
| Haze (%) | 0.7 | 2.9 | 0.8 | 0.8 | 0.7 | 0.8 | 0.7 |
| Total light transmittance (%) | 92.5 | 91.0 | 92.4 | 92.4 | 92.5 | 92.3 | 92.4 |
| Light guiding properties | | | | | | | |
| Light transmittance (%) | 82.5 | 60.0 | 81.3 | 81.3 | 81.2 | 80.8 | 81.5 |
| Yellowness b* | 0.9 | 0.5 | 1.2 | 1.2 | 1.6 | 1.4 | 1.4 |

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Acrylic block copolymers (A) | | | | | | | | | | |
| Acrylic block copolymer (A1) (parts by mass) | 100 | 100 | 100 | 100 | 100 | 100 | 100 | 100 | 100 | 100 |
| Acrylic block copolymer (A2) (parts by mass) | | | | | | | | | | |
| Acrylic block copolymer (A3) (parts by mass) | | | | | | | | | | |
| Light diffusing agents (B) | | | | | | | | | | |
| Titanium oxide (b-1) (ppm) *1 | | | | | | | | | | |
| Titanium oxide (b-2) (ppm) *1 | | 7.5 | | | | | | | | |
| Aluminum oxide (b-3) (ppm) *1 | | | 7.5 | | | | | | | |
| Polystyrene (b-4) (ppm) *1 | | | | 7.5 | | | | | | |
| Polystyrene (b-5) (ppm) *1 | | | | | 7.5 | | | | | |
| Polystyrene (b-6) (ppm) *1 | | | | | | 7.5 | | | | |
| Silicone resin (b-7) (ppm) *1 | | | | | | | 7.5 | | 65 | |
| Silicone resin (b-8) (ppm) *1 | | | | | | | | 7.5 | | 65 |
| Antioxidant (C) | | | | | | | | | | |
| Phosphite compound (c-1) (parts by mass) *2 | 0.1 | 0.1 | 0.1 | 0.1 | 0.1 | 0.1 | 0.1 | 0.1 | 0.1 | 0.1 |
| Colorants (D) | | | | | | | | | | |
| Blue colorant (d-1) (ppm) *1 | | | | | | | | | | |
| Purple colorant (d-2) (ppm) *1 | | | | | | | | | | |
| Light diffusing agent | | | | | | | | | | |
| Average particle size (μm) | — | 0.3 | 1.5 | 4 | 6 | 12 | 2 | 6 | 2 | 6 |
| Thermal stability | — | A | A | B | B | B | A | A | A | A |
| Luminescent properties | | | | | | | | | | |
| Surface luminance (cd/m²) | 4 | 195 | 10 | 5 | 5 | 5 | 4 | 4 | 8 | 5 |
| Transparency | | | | | | | | | | |
| Haze (%) | 0.4 | 6.9 | 1.8 | 2.4 | 1.8 | 0.9 | 1.9 | 1.6 | 15.8 | 10.7 |
| Total light transmittance (%) | 92.7 | 88.9 | 92.6 | 92.8 | 92.8 | 92.6 | 92.7 | 92.8 | 92.8 | 92.6 |
| Light guiding properties | | | | | | | | | | |
| Light transmittance (%) | 84.6 | 29.7 | 77.5 | 71.9 | 81.7 | 83.2 | 82.1 | 83.1 | 63.8 | 71.5 |
| Yellowness b* | 2.2 | 0.1 | 2.5 | 2.8 | 2.4 | 2.2 | 2.3 | 2.1 | 3.4 | 2.6 |

*1) Content (on mass basis) relative to acrylic block copolymer (A)
*2) Content per 100 parts by mass of acrylic block copolymer (A)

The results in Table 2 show that the resin compositions containing rutile titanium oxide (b-1) with an average particle size of 1.0 μm attained excellent luminescent properties while maintaining high levels of transparency and light guiding properties (Examples 1, 2 and 7 to 11). The resin compositions of Examples 1 and 2 were particularly excellent in such properties.

In contrast, the resin composition which did not contain the light diffusing agent (B) was demonstrated to be poor in luminescent properties (Comparative Example 1). Further, the resin composition containing titanium oxide (b-2) with an average particle size of 0.3 μm was poor in transparency and light guiding properties (Comparative Example 2). The resin compositions containing the light diffusing agent (B)

other than titanium oxides were shown to be of poor quality with low luminescent properties and high yellowness (Comparative Examples 3 to 10).

Examples 3 to 6, 12 and 13

With use of a twin-screw extruder, the acrylic block copolymers (A1) to (A3) obtained in Production Examples 1 to 3, the light diffusing agents (B) and the antioxidant (C) were melt-kneaded in the proportions described in Table 3 below at a cylinder temperature of 200° C. The kneaded products were extruded and cut to give pellets of resin compositions. The results of the evaluation of the resin compositions are described in Table 3 together with the results of Comparative Example 1.

Comparative Examples 11 to 13

With use of a twin-screw extruder, the acrylic block copolymer (A1) obtained in Production Example 1, the light diffusing agents (B) and the antioxidant (C) were melt-kneaded in the proportions described in Table 3 below at a cylinder temperature of 200° C. The kneaded products were extruded and cut to give pellets of resin compositions. The results of the evaluation of the resin compositions are described in Table 3.

In contrast, the resin composition which did not contain the light diffusing agent (B) was demonstrated to have low luminance and to cause a large change in chromaticity (Comparative Example 1). Further, the resin compositions containing the light diffusing agent (B) other than titanium oxides performed unsatisfactorily with a large change in chromaticity (Comparative Examples 11 to 13).

The invention claimed is:

1. A resin composition, comprising an acrylic block copolymer (A), a light diffusing agent (B), an antioxidant (C), and a colorant (D),
wherein the acrylic block copolymer (A) comprises at least one structure in which polymer blocks (a1) based on methacrylic acid ester units are bonded to both ends of a polymer block (a2) based on acrylic acid ester units, and has a weight average molecular weight of 10,000 to 150,000 and a tensile elastic modulus of 1 to 1,500 MPa,
the light diffusing agent (B) is rutile titanium oxide having an average particle size of 0.5 to 2.0 µm, a content of the light diffusing agent (B) is 0.5 to 10 ppm by mass, based on the acrylic block copolymer (A), and
the colorant (D) is selected from the group consisting of a blue colorant with a maximum absorption wavelength

TABLE 3

| | Ex. 3 | Ex. 4 | Ex. 5 | Ex. 6 | Ex. 12 | Ex. 13 | Comp. Ex. 1 | Comp. Ex. 11 | Comp. Ex. 12 | Comp. Ex. 13 |
|---|---|---|---|---|---|---|---|---|---|---|
| Acrylic block copolymers (A) | | | | | | | | | | |
| Acrylic block copolymer (A1) (parts by mass) | 100 | 100 | 100 | 100 | | | 100 | 100 | 100 | 100 |
| Acrylic block copolymer (A2) (parts by mass) | | | | | 100 | | | | | |
| Acrylic block copolymer (A3) (parts by mass) | | | | | | 100 | | | | |
| Light diffusing agents (B) | | | | | | | | | | |
| Titanium oxide (b-1) (ppm) *1) | 1 | 3 | 5 | 7 | 1 | 1 | | | | |
| Aluminum oxide (b-3) (ppm) *1) | | | | | | | | 10 | 20 | 30 |
| Antioxidant (C) | | | | | | | | | | |
| Phosphite compound (i) (parts by mass) *2) | 0.1 | 0.1 | 0.1 | 0.1 | 0.1 | 0.1 | 0.1 | 0.1 | 0.1 | 0.1 |
| Extrusion temperature (° C.) | 185 | 185 | 185 | 185 | 190 | 175 | 185 | 185 | 185 | 185 |
| Luminance of light guide | | | | | | | | | | |
| At 10 cm distance from light source (cd/m$^2$) | 236 | 725 | 1081 | 1794 | 250 | 245 | 94 | 198 | 271 | 349 |
| At 90 cm distance from light source (cd/m$^2$) | 90 | 54 | 22 | 7 | 76 | 80 | 52 | 41 | 47 | 13 |
| Chromaticity of light guide (at 10 cm distance from light source) | | | | | | | | | | |
| x | 0.337 | 0.334 | 0.341 | 0.339 | 0.360 | 0.350 | 0.323 | 0.332 | 0.325 | 0.329 |
| y | 0.336 | 0.335 | 0.342 | 0.340 | 0.365 | 0.352 | 0.323 | 0.332 | 0.324 | 0.328 |
| Chromaticity of light guide (at 90 cm distance from light source) | | | | | | | | | | |
| x | 0.354 | 0.351 | 0.346 | 0.342 | 0.385 | 0.371 | 0.349 | 0.376 | 0.381 | 0.394 |
| y | 0.363 | 0.362 | 0.360 | 0.359 | 0.401 | 0.384 | 0.358 | 0.383 | 0.387 | 0.397 |
| Rate (%) of change in chromaticity of light guide [absolute value] | | | | | | | | | | |
| x | 5 | 5 | 1 | 1 | 7 | 6 | 8 | 13 | 17 | 20 |
| y | 8 | 8 | 5 | 5 | 10 | 9 | 11 | 15 | 20 | 21 |

*1) Content (on mass basis) relative to acrylic block copolymer (A)
*2) Content per 100 parts by mass of acrylic block copolymer (A)

From the results described in Table 3, the resin compositions containing 0.5-10 ppm (on mass basis) rutile titanium oxide (b-1) with an average particle size of 1.0 µm exhibited high luminance and attained a small change in chromaticity when light was guided therethrough, and were thus demonstrated to be more suited as light guides (Examples 3 to 6, 12 and 13).

in a range of from 590 to 610 nm, and a purple colorant with a maximum absorption wavelength in a range of from 510 to 530 nm.

2. The resin composition of claim 1, which comprises 0.01 to 1 part by mass of a phosphite compound of formula (i) below as the antioxidant (C) per 100 parts by mass of the acrylic block copolymer (A),

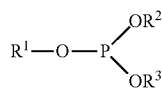 (i)

wherein $R^1$ is an optionally substituted aromatic group, $R^2$ and $R^3$ are each independently a hydrogen atom or an organic group, $R^1$ and $R^2$ or $R^3$ may be bonded to each other to form a ring together with the phosphorus atom and the oxygen atom constituting the phosphite, and $R^2$ and $R^3$ may be bonded to each other to form a ring together with the phosphorus atom and the oxygen atom constituting the phosphite.

3. The resin composition of claim 1, wherein a refractive index of the acrylic block copolymer (A) is 1.485 to 1.495.

4. The resin composition of claim 1, wherein an order-disorder transition temperature (ODTT) of the acrylic block copolymer (A) is not more than 260° C.

5. The resin composition of claim 1, wherein the polymer block (a2) is a copolymer block comprising 50 to 90 mass % of an acrylic acid alkyl ester and 50 to 10 mass % of an acrylic acid aromatic ester.

6. The resin composition of claim 1, wherein the polymer blocks (a1) and the polymer block (a2) each have a refractive index of 1.485 to 1.495.

7. The resin composition of claim 1, which comprises 0.1 to 4 ppm by mass, based on the acrylic block copolymer (A), of the blue colorant with a maximum absorption wavelength in a range of from 590 to 610 nm as a colorant (D).

8. The resin composition of claim 1, which comprises 0.1 to 10 ppm by mass, based on the acrylic block copolymer (A), of the purple colorant with a maximum absorption wavelength in a range of from 510 to 530 nm as a colorant (D).

9. A shaped article, comprising the resin composition of claim 1.

10. The shaped article of claim 9, which is an optical element.

11. The shaped article of claim 9, which is a light guide.

* * * * *